Aug. 28, 1934.  P. M. CONTANT  1,971,338
FLOW CONTROL SYSTEM
Filed Aug. 13, 1930   2 Sheets-Sheet 1
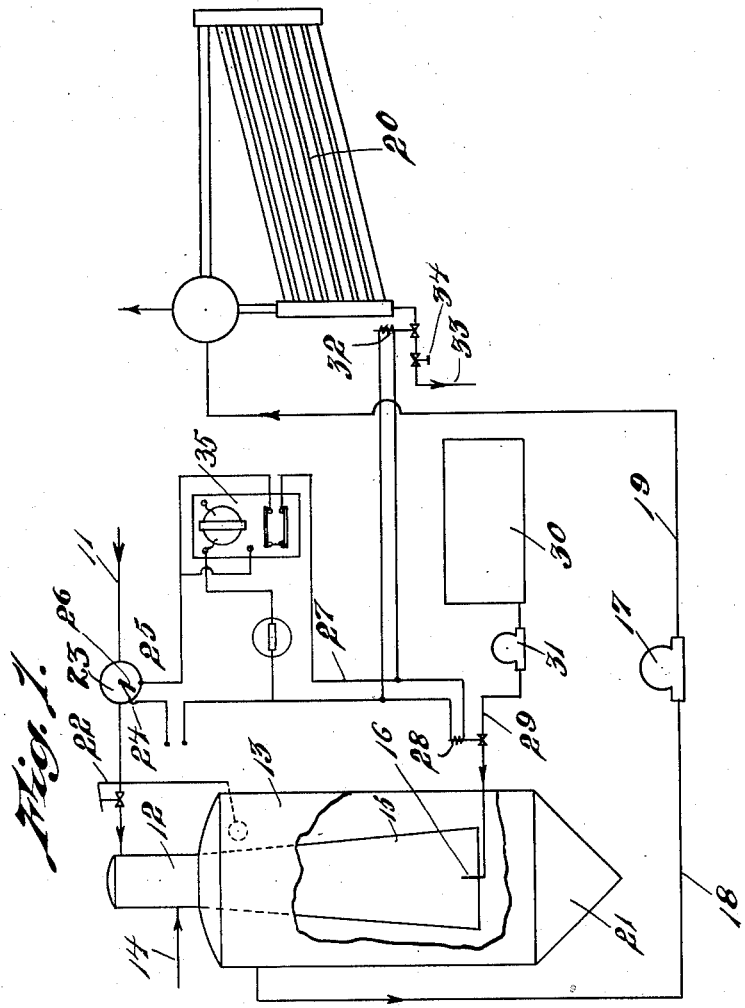
INVENTOR
Peter M. Contant
BY Nathaniel Frucht
his ATTORNEY

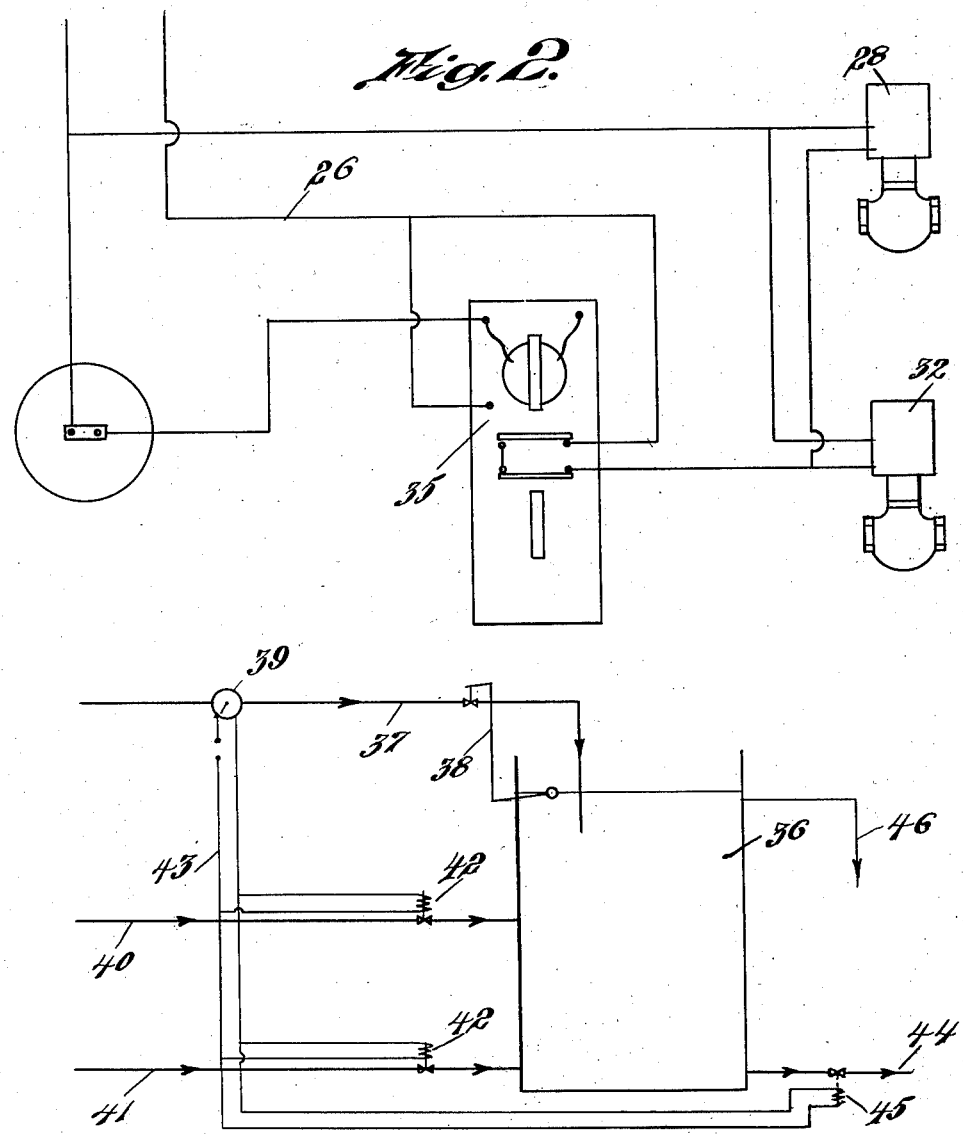

Patented Aug. 28, 1934

1,971,338

UNITED STATES PATENT OFFICE 1,971,338

FLOW CONTROL SYSTEM

Peter M. Contant, Maywood, N. J., assignor to Neckar Water Softener Corporation, New York, N. Y., a corporation of New York Application August 13, 1930, Serial No. 474,991

4 Claims. (Cl. 122—382)

The present invention relates to methods and apparatus for controlling liquid flow, and has particular reference to proportionate controls for a plurality of flow streams.

In carrying out a chemical process, it is often necessary to provide a proportionate flow of two or more solutions. While equipment for such flow control is known, it is difficult to control a small continuous flow, as the flow of a solution through small orifices or valves is greatly affected by the slightest deposit or coating of solid matter in the flow passages.

It therefore becomes preferable to provide an intermittent supply of such solutions in larger quantities, this intermittent supply being in exact proportion and correspondence to the demand, which may be either continuous or intermittent.

Thus, in the treatment of boiler feed water, solutions of reagents may be intermittently introduced into a treatment tank in proportion to the amount of raw water introduced, the raw water supply varying in accordance with fluctuations in the steam demand. It may also be necessary to withdraw a small quantity of water from the boiler, this quantity to be proportional to the flow of feedwater to the boiler. It is advantageous to substitute proportional intermittent flow for the small continuous flow.

With these and other advantageous features in view, the invention consists in a novel arrangement of control apparatus and in a novel method of control more fully disclosed in the detailed description following, in conjunction with the accompanying drawings, and more particularly defined in the appended claims.

In the drawings:

Fig. 1 is a schematic representation showing a preferred form of control layout;

Fig. 2 illustrates the wiring connections for utilizing a time relay; and

Fig. 3 is a modified layout suitable for the use of a plurality of reagent solutions.

Referring to the drawings, Figure 1 illustrates the application of the novel control to a feed water treatment arrangement for a boiler. The raw water is fed through a pipe or conduit 11 to the dome 12 of a treatment tank 13, heating steam being admitted through an inlet pipe 14. The dome may, if desired, have the usual heating shelves to permit thorough heating of the raw water, or the raw water may be sprayed in to condense the steam.

The heated water flows by gravity into the reaction chamber 15, where chemical reagents introduced through a nozzle inlet 16 combine with and precipitate the impurities. The treated water flows upwardly around the reaction chamber, and is pumped by the feed pump 17 through the conduits 18, 19 to the boiler 20, the precipitated impurities collecting in the discharge hopper 21 for periodic discharge therefrom.

Any variation in steam output from the boiler while maintaining a uniform water level results in a corresponding variation in the rate of flow of the feed through conduit 19, in the usual manner and a similar variation in the flow of raw water through pipe 11, as the water in the treatment tank is preferably maintained at a uniform level by means of a float valve control 22.

A water meter 23 is inset into the pipe 11, and the quantity of raw water fed to the treatment tank is automatically registered thereon. This meter is equipped with electrical contacts 24, 25, to permit a movable arm 26 to close an electrical circuit 27; the circuit controls the actuation of a solenoid valve 28 positioned in the conduit 29 which conveys the treatment solution from the chemical tank 30, through the solution pump 31, to the nozzle 16.

Preferably, a second solenoid valve 32 is also included in the circuit and controls blow down from the boiler through the blow down line 33, a needle valve 34 being inserted in this line to permit close adjustment and regulation.

An example of the treatment is herewith illustrated. The composition of raw water from a typical supply source is as follows:

| | Parts per million |
|---|---|
| Suspended solids | 36 |
| Soluble solids | 371 |
| Silica | 15 |
| Iron and Al. oxide | 3 |
| Calcium | 103 |
| Magnesium | 17 |
| Bicarbonates | 234 |
| Sulphates | 93 |
| Chlorides | 15 |
| Nitrates | Trace |

This water requires, for proper treatment, 265 parts per million of 90% effective hydrate of lime and about 158 parts per million of sodium carbonate. The total water required must be sufficient to replenish the steam evaporated and the blow down. The load may fluctuate from 20,000 lbs. to 50,000 lbs. per hour, and may be 280,000 lbs. in an 8-hour day, and the blow down should be approximately 5% in order to keep the total dissolved solidts in the boiler below 3700 P. P. M.

The chemical feed and the blow down should be in proportion to the actual load; under the outlined conditions, the meter in the raw water line is set to make a contact after each 175 lbs. of water has passed. The solenoid valve 28 is opened at each contact for a definite time period sufficient to permit 2 lbs. of solution to pass to the treatment tank, this quantity containing .0464 lbs. of lime hydrate and .0266 lbs. of sodium carbonate; the solenoid valve 33 also opens to allow 8.75 lbs. of boiler water to be blown down.

To render the period in which the valves stay open uniform, a time relay switch 35, (see Figure 2) of standard type, is preferably inserted into the solenoid lines to maintain the solenoid valves open for a definite time period for each contact made by the flow meter arm.

If desired, a similar arrangement may be used, as indicated in Figure 3, to control the flow of a plurality of chemical solutions to a treatment tank. In this modification, the tank 36 receives fluid such as raw water through conduit 37, the conduit having a float control valve 38 and a quantity meter 39 therein. A plurality of conduits 40, 41 for chemical solutions are each controlled by solenoid valves 42 included in an electrical circuit 43 with the flow meter. A tank outlet conduit 44 may also be controlled by a solenoid valve 45 which is included in the same electrical circuit 43. Conduit 46 is the main outlet of vessel 36 and the flow through conduits 37, 40, 41, and 44 will be proportional to the flow through conduit 46.

When using gases instead of liquids, the float control valves shown are changed to the pressure control type.

The operation of the control arrangement is now clear. The solution flow is always in direct proportion to the flow of liquid to be treated, but is intermittent, whereas the governing flow may be constant or intermittent, depending on the operating conditions. The solenoid valves are of large size, are not practically affected by a slight coating of solids, and easily cleaned. Automatic control is therefore obtained with standard equipment apparatus, thus reducing the cost of installation and of necessary repair and replacement.

The term "flow meter" as used in the description is used to designate any apparatus through which a fluid flow is conducted, the velocities of flow being proportional to the rate of flow. While the connection between the flow meter and the proportioning control valves is preferably electrical, these valves may be mechanically connected to the flow meter if the control layout permits.

While I have described specific control layouts suitable for the treatment of boiler feed water, it is obvious that the method of control is independent of the fluid treated and of the fluid or fluids used for treatment, and of the particular types of flow meters or valves used and their operating mechanism, and that the apparatus may be modified or changed to suit the needs of the requirements for individual chemical processes, within the spirit and the scope of the invention as defined in the appended claims.

1. In combination, a boiler, a feed water treatment chamber, a raw water supply conduit for said chamber, a flow meter in said conduit, a heating steam supply conduit for said chamber, a treatment solution supply conduit for said chamber, a valve in said treatment solution supply conduit, a feed supply conduit leading from said chamber to said boiler, a flow measuring device for measuring the quantity of raw water supplied, electrically responsive means for opening the valve in the treatment solution supply conduit upon supply of a predetermined quantity of raw water, and a time limit relay device for limiting the duration of opening of said valve to a predetermined time period.

2. In combination, a boiler, a feed water treatment chamber, a raw water supply conduit for said chamber, a flow meter in said conduit, a heating steam supply conduit for said chamber, a treatment solution supply conduit, a valve in said treatment solution supply conduit, a feed supply conduit leading from said chamber to said boiler, a blow-off line for said boiler, a valve in said blow-off line, and means responsive to passage of raw water through said flow meter to periodically open and close said valves for a predetermined period of time.

3. In combination, a treatment chamber, means for withdrawing treated fluid therefrom, means for introducing fluid to be treated thereto in correspondence to the withdrawal of treated fluid, a flow measuring device for measuring the introduced quantity of fluid to be treated, a treatment material flow control valve, electrically responsive means for opening said valve upon introduction of a predetermined quantity of fluid to be treated, and a time limit relay device for limiting the duration of opening of said valve to a predetermined time period.

4. In combination, a boiler having a blow-off line, a feed water treatment chamber, a raw water supply conduit for said chamber, a flow meter in said conduit, a heating steam supply conduit for said chamber, a treatment solution supply conduit, a valve in said treatment solution supply conduit, a feed supply conduit leading from said chamber to said boiler, a valve in said blow-off line, and means responsive to each passage of a definite amount of raw water through said flow meter to open said valves for predetermined periods of time.

PETER M. CONTANT.